United States Patent [19]

Matsushita et al.

[11] 4,048,112

[45] Sept. 13, 1977

[54] CATALYST FOR SELECTIVE REDUCTION OF NITROGEN OXIDES

[75] Inventors: Kunichi Matsushita, Kawasaki; Hikaru Sakurada, Yokohama; Kazuhiko Onuma; Shinichi Fujii, both of Kawasaki, all of Japan

[73] Assignee: Mitsubishi Chemical Industries Ltd., Tokyo, Japan

[21] Appl. No.: 685,920

[22] Filed: May 12, 1976

Related U.S. Application Data

[63] Continuation-in-part of Ser. No. 504,824, Sept. 10, 1974, abandoned.

[30] Foreign Application Priority Data

| Sept. 10, 1973 | Japan | 48-101975 |
| Oct. 9, 1973 | Japan | 48-113620 |
| Oct. 11, 1973 | Japan | 48-114134 |
| Oct. 15, 1973 | Japan | 48-115630 |

[51] Int. Cl.$^2$ .................. B01J 21/06; B01J 23/22
[52] U.S. Cl. .................. 252/461; 423/213.2; 423/239
[58] Field of Search ............ 252/461; 423/213.2, 423/239

[56] References Cited

U.S. PATENT DOCUMENTS

| 3,279,884 | 10/1966 | Nonnenmacher et al. | 423/239 |
| 3,565,919 | 2/1971 | Friedrichsen et al. | 252/461 X |
| 3,873,469 | 3/1975 | Foster et al. | 252/455 R |

Primary Examiner—W. J. Shine
Attorney, Agent, or Firm—Oblon, Fisher, Spivak, McClelland & Maier

[57] ABSTRACT

A catalyst for the selective reduction of nitrogen oxides in exhaust gases in the presence of ammonia is vanadium oxide supported on a specific carrier of the anatase form of titanium oxide.

3 Claims, No Drawings

CATALYST FOR SELECTIVE REDUCTION OF NITROGEN OXIDES

CROSS REFERENCE TO RELATED APPLICATIONS

This application is a continuation-in-part of application Ser. No. 504,824, filed Sept. 10, 1974, and now abandoned.

BACKGROUND OF THE INVENTION

1. Field of the Invention

The present invention relates to a catalyst for the selective reduction of nitrogen oxides, e.g. NO, $NO_2$ (hereinafter referred to as $NO_x$) present in exhaust gases in the presence of ammonia.

2. Description of the Prior Art

Nitrogen oxides ($NO_x$) are toxic to the human body. When $NO_x$ is absorbed by the human body, body functions begin to decline. There is a very demanding need for efficient methods of removing $NO_x$ because $NO_x$ is an oxidant which causes photochemical smog. Accordingly, it is of utmost importance to remove $NO_x$ from exhaust gases which are evolved from polluting sources such as power plants, nitric acid plants, automobiles and the like. Heretofore, various methods for removing $NO_x$ have been proposed. In the conventional methods, the catalytic reduction method in which ammonia is used as a reducing agent has been effective for treating exhaust gases containing relatively high concentrations of NO and $O_2$.

In another method, the exhaust gases are contacted with a vanadium oxide catalyst. However, when the vanadium oxide catalyst is prepared by immersing a known carrier in an aqueous solution of a vanadium salt and then calcining the product, and then is used and the $NO_x$ in the gas is reduced in the presence of ammonia, the catalytic activity is not satisfactory and also the optimum temperature range is limited. When the catalyst is used for removing $NO_x$ in a combustion exhaust gas containing $NO_x$ and sulphur oxides, it is hard to maintain the catalytic activity for decomposition of $NO_x$ for a long time.

A need, therefore, continues to exist for an improved method of catalytically reducing nitrogen oxides in exhaust gases.

SUMMARY OF THE INVENTION

Accordingly, one object of the present invention is to provide a catalyst for reducing nitrogen oxides with high catalytic activity in a wide temperature range as well as high durability against sulfur oxides contamination.

Briefly, this object and other objects of the invention as hereinafter will become more readily apparent can be attained by providing a catalyst for selective reduction of nitrogen oxides in exhaust gases in the presence of ammonia which comprises vanadium oxide supported on a specific carrier of the anatase form of titanium oxide.

DETAILED DESCRIPTION OF THE PREFERRED EMBODIMENTS

The exhaust gases containing $NO_x$ treated by the method of the invention include a variety of exhaust gases discharged from polluting sources such as power plants, nitric acid plants, automobile engines, and the like. Usually exhaust gases contain more than 0.1 vol. % oxygen, especially 2 – 10 vol. % oxygen together with $NO_x$. Also, ammonia is usually fed into the exhaust gas in amounts such that the mole ratio of ammonia to $NO_x$ in the exhaust gas is more than 0.5, preferably 0.5 – 2. If the mole ratio of ammonia is $NO_x$ is too low, the desired $NO_x$ decomposing effect can not be attained. If the mole ratio of ammonia to $NO_x$ is too high, the process is not economical and unreacted ammonia is evolved in the exhaust gases.

Suitable catalyst used in the present invention include those in which vanadium oxide is supported on a specific carrier of the anatase form of titanium oxide. The anatase form of titanium oxide has a quite different crystalline structure from the rutile form of titanium oxide as shown in Kirk-Othmer, "Encyclopedia of Chemical Technology" Vol. 20 Pages 393 and 394. The crystal structure of the former is very loose while the latter is closely packed. The special effect of the present invention can be attained by supporting vanadium oxide on the anatase form titanium oxide.

The vanadium oxide catalyst can be prepared as follows. Vanadium pentoxide or a vanadium salt such as vanadyl sulfate, vanadyl chloride or ammonium metavandate is dissolved in water with oxalic acid. The molded anatase form of titanium oxide is dipped into the aqueous solution for several hours, and the material isolated is dried and calcined. The resulting powder is dipped into the aqueous solution and the wet powder is extruded into a mold, if desired after the catalyst is dried or after it is dried and calcined, to decompose the catalyst.

The shape of the anatase form of titanium oxide support can be any shape including spherical, pellet and honeycomb shaped carriers.

The vanadium oxide is supported on the carrier in amounts ranging from 0.1 – 50 % by weight, especially 1 – 20 % by weight based on the total weight of the catalyst.

After the treatment in which the carrier is impregnated with the aqueous solution, the catalyst is gradually heated in air or under a nitrogen atmosphere to dryness. Thereafter, it is calcined at 400 – 700° C to give a supported vanadium catalyst.

In order to catalytically reduce $NO_x$ in the exhaust gases using the catalysts prepared by the above methods, it is very effective to pass the exhaust gases through a catalyst zone at a space velocity of 1,000 – 150,000 $hr^{-1}$, preferably 10,000 – 100,000 $hr^{-1}$ at a temperature of 150° – 650° C, preferably 200° – 500° C. The reduction products are mostly nitrogen and water. When the catalytic reduction of $NO_x$ is performed in the presence of ammonia using the catalyst prepared by the above methods, the catalytic activity is substantially higher than the activity of conventional catalysts. The high catalytic activity is maintained without substantial change in activity, even though the temperature is changed. Accordingly, the method of the present invention is advantageous in practical operations. Moreover, the temperature of sulfur oxide could hinder least the catalytic activity.

Having generally described this invention, a further understanding can be obtained by reference to certain specific examples which are provided herein for purposes of illustration only and are not intended to be limiting unless otherwise specified.

In the examples, the catalytic activity tests were conducted as follows. A gas containing 10 vol. % of oxygen, 2,000 ppm of $NO_x$ ($NO_2$ 300 ppm) and 3,000 ppm of NH₃ was passed through a catalyst layer at a space velocity of 20,000 hr⁻¹, at a predetermined temperature. The concentration of $NO_x$ was measured before and after the addition of ammonia, and the extent of $NO_x$ removal (%) is given by the following equation.

Amount of $NO_x$ removed (%) = [{$NO_x$ (inlet) − $NO_x$(outlet)}/$NO_x$(inlet)] × 100

The concentration of $NO_x$ was measured by the chemi-luminescent $NO_x$ analyzer (CLN-201 manufactured by Shimazu-Seisakusho K.K.).

EXAMPLE I

A titanium oxide powder (anatase type, surface area of 36 m²/gr) was molded into tablets having a diameter of 8 mm and a thickness of 2 mm. A 10 ml amount of the tablets was immersed in 10 ml of an aqueous solution of vanadyl oxalate prepared by dissolving 3.58 of vanadium pentoxide and 8.24 g of oxalic acid in water for one hour. The resulting suspension was filtered and the residual tablets were dried and calcined at 250° C for 1 hour, at 350° C for 1 hour and then at 500° C for 3 hours in an air stream to yield a catalyst of 10 wt. % vanadium oxide supported on titanium oxide. The results of the $NO_x$ reduction tests using the catalyst are shown in Table 1.

REFERENCE EXAMPLE 1

A titanium oxide powder (rutile type surface area of 8.5m²/gr) was molded into tablets having a diameter of 8 mm and a thickness of 2 mm. A 10 ml amount of the tablets was immersed into 10ml of an aqueous solution of vanadyl oxalate prepared by dissolving 4.96 g vanadium pentoxide and 11.4 g of oxalic acid in water for 1 hour. The resulting suspension was filtered and the residual tablets were dried and calcined in accordance with the process of Example 1 to yield a catalyst of 10 wt. % vanadium oxide supported on titanium oxide. The results of the $NO_x$ reduction tests using the catalyst are shown in Table 1.

REFERENCE EXAMPLE 2

A titanium oxide powder (rutile type surface area of 6.8 m²/gr) was molded into tablets having a diameter of 8 mm and a thickness of 2 mm. A 10 ml amount of the tablets was immersed in 10 ml of an aqueous solution of vanadyl oxalate prepared by dissolving 5.29 g of vanadium pentoxide and 12.17 g of oxalic acid in water for 1 hour. The resulting suspension was filtered and the residual tablets were dried and calcined in accordance with the process of Example 1 to yield a catalyst of 10 wt. % vanadium oxide supported on titanium oxide. The results of the $NO_x$ reduction tests using the catalyst are shown in Table 1.

EXAMPLE 2

A titanium oxide powder (anatase type, surface area of 22 m²/gr) was moled into tablets having a diameter of 8 mm and a thickness of 2 mm. A 10 ml amount of the tablets was immersed in 10 ml of an aqueous solution of vanadyl oxalate prepared by dissolving 3.58 of vanadium pentoxide and 8.24 g of oxalic acid in water for 1 hour. The resulting suspension was filtered and the residual tablets were dried and calcined at 250° C for 1 hour, at 350° C for 1 hour and then at 500° C for 3 hours in an air stream to yield a catalyst of 10 wt. % vanadium oxide supported on titanium oxide. The results of the $NO_x$ reduction tests using the catalyst are shown in the following Table.

Table 1

| | Amount of $V_2O_5$ supported (wt. %) | Amount of catalyst (g) | Reaction (° C) temp. | Amount of $NO_x$ removed (%) |
|---|---|---|---|---|
| Example 1 Anatase type | 10 | 9.9 | 240 | 80 |
| | | | 280 | 90 |
| | | | 320 | 94 |
| | | | 340 | 95.5 |
| | | | 370 | 95.5 |
| | | | 400 | 91.5 |
| Reference 1 Rutile type | 10 | 11.8 | 250 | 64 |
| | | | 300 | 79 |
| | | | 340 | 86 |
| | | | 380 | 89.5 |
| | | | 400 | 89.5 |
| | | | 420 | 85 |
| Reference 2 Rutile type | 10 | 12.4 | 280 | 58 |
| | | | 320 | 68 |
| | | | 360 | 74 |
| | | | 400 | 75.5 |
| | | | 420 | 73 |
| Example 2 Anatase type | 10 | 12.7 | 320 | 91 |
| | | | 360 | 94 |
| | | | 400 | 90.5 |

Having now fully described the invention, it will be apparent to one of ordinary skill in the art that many changes and modifications can be made thereto without departing from the spirit or scope of the invention as set forth herein.

We claim:

1. A catalyst for the selective reduction of nitrogen oxides in exhaust gases in the presence of ammonia, which consists of: vanadium oxide supported on a carrier of the anatase form of titanium oxide.

2. The catalyst of claim 1, wherein said catalyst is prepared by dipping the carrier of the anatase form of titanium oxide in an aqueous solution of vanadium compound and calcining the resulting product at 400° − 700° C.

3. The catalyst of claim 1, wherein vanadium oxide content is 0.1 − 50 % by weight based on total weight of the catalyst.

* * * * *